United States Patent [19]

Paul et al.

[11] Patent Number: 5,151,196
[45] Date of Patent: Sep. 29, 1992

[54] METHOD FOR REGENERATING SCALE SOLVENT

[75] Inventors: James M. Paul, Dallas; Richard L. Morris, Duncanville, both of Tex.

[73] Assignee: Mobil Oil Corporation, Fairfax, Va.

[21] Appl. No.: 766,313

[22] Filed: Sep. 27, 1991

[51] Int. Cl.⁵ .............................................. C02F 1/62
[52] U.S. Cl. ..................... 210/712; 210/724; 134/13; 134/22.14; 134/22.19; 252/82; 252/86
[58] Field of Search ............ 210/702, 712, 724, 698; 134/10, 13, 22.1, 22.11, 22.14, 22.19; 252/80, 82, 86

[56] References Cited

U.S. PATENT DOCUMENTS

| | | | |
|---|---|---|---|
| 2,274,694 | 12/1956 | Wiggins | 134/13 |
| 2,396,938 | 3/1946 | Bersworth | 210/698 |
| 2,564,092 | 8/1951 | Bersworth | 210/698 |
| 3,033,214 | 5/1962 | Bersworth et al. | 134/13 |
| 3,527,609 | 9/1970 | Vinso | 210/698 |
| 3,625,761 | 12/1971 | Tate | 134/13 |
| 4,030,548 | 6/1977 | Richardson et al. | 210/698 |
| 4,708,805 | 11/1987 | D'Muhala | 210/698 |
| 5,087,371 | 2/1992 | Morris et al. | 210/643 |

Primary Examiner—Stanley S. Silverman
Assistant Examiner—Neil M. McCarthy
Attorney, Agent, or Firm—Alexander J. McKillop; Charles J. Speciale; Lawrence O. Miller

[57] ABSTRACT

Barium sulfate scale is dissolved by contacting the scale with an aqueous solvent having a pH of about 10 to about 14, preferably about 12, and comprising a chelating agent comprising a polyaminopolycarboxylic acid or salt of such an acid, and a synergist anion. The solvent containing the dissolved scale is regenerated by acidifying the spent solvent with an acidic chelating agent such as EDTA or DTPA, preferably DTPA, that release alkaline earth cations which react with sulfate ions present in the solvent to form a precipitate of an insoluble salt of the alkaline earth metal. The precipitate is then removed from the solvent by settling/decanting, filtering, or centrifuging. Thereafter, caustic is added to increase the pH of the solvent to a pH of about 10 to about 14, preferably about 12, to recover a regenerated solvent for reuse, in dissolving scale. The amount of chelating agent added to acidify the spent solvent balances the total amount of dilution caused by adding the caustic thereby maintaining the activity of the chelating agent in the regenerated solvent at least equivalent to or greater than the activity in the spent solvent.

10 Claims, 1 Drawing Sheet

Regeneration of Scale Solvent
pH reduction to 6 (DTPA)

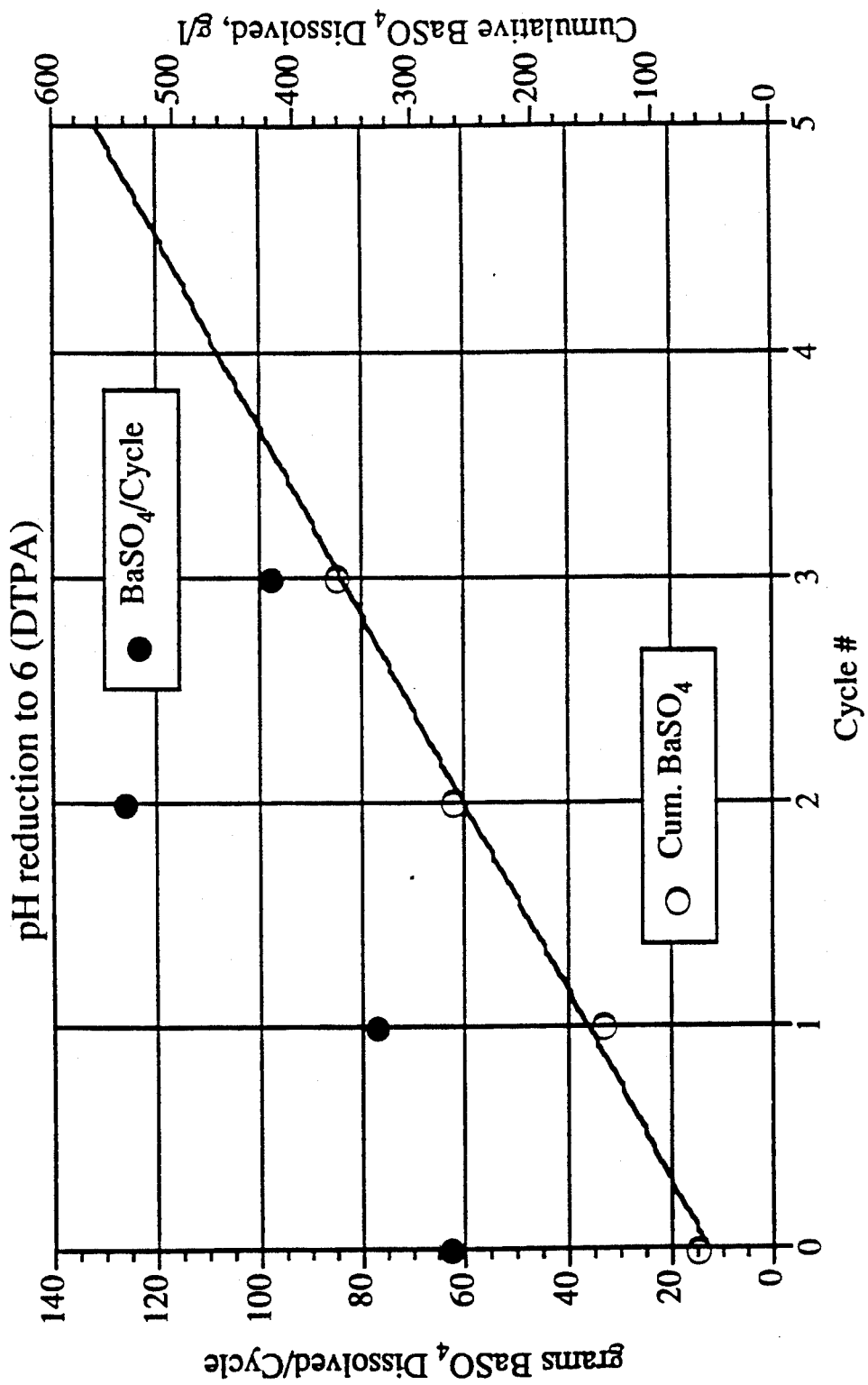

METHOD FOR REGENERATING SCALE SOLVENT

CROSS REFERENCE TO RELATED APPLICATION

This application is related to prior co-pending application Ser. No. 07/593,136, filed Oct. 5, 1990, of J. M. Paul and R. L. Morris.

1. Field of the Invention

This invention relates to solvent compositions which are effective for solubilizing and removing scale, particularly strontium and barium sulfate scale, and naturally occurring radioactive material (NORM), usually containing mainly radium 226 and radium 228, from surfaces with scale deposits on them, the improvement residing in a novel treatment of the solvent to remove the dissolved scale so that the solvent can be regenerated for reuse.

2. Background of the Invention

Many waters contain alkaline earth metal cations, such as barium, strontium, calcium and magnesium, and anions, such as sulfate, bicarbonate, carbonate, phosphate and fluoride. When combinations of these anions and cations are present in concentrations which exceed the solubility product of the various species which may be formed, precipitates form until the respective solubility products are no longer exceeded. For example, when the concentrations of the barium and sulfate ions exceed the solubility product of barium sulfate, a solid phase of barium sulfate will form as a precipitate. Solubility products are exceeded for various reasons, such as evaporation of the water phase, change the pH, pressure or temperature and the introduction of additional ions which can form insoluble compounds with the ions already present in the solution.

As these reaction products precipitate on the surfaces of the water-carrying or water-containing system, they form adherent deposits or scale. Scale may prevent effective heat transfer, interfere with fluid flow, facilitate corrosive processes, or harbor bacteria. Scale is an expense problem in any industrial water systems, in production systems for oil and gas, in pulp and paper mill systems, and in other systems, causing delays and shutdowns for cleaning and removal.

In the co-pending application referenced above, there is disclosed a method for removing barium sulfate and other sulfate scales by a solvent comprising a combination of a chelating agent comprising a catalyst or synergist comprising polyaminopolycarboxylic acid such as EDTA or DTPA together with anions of (1) a monocarboxylic acid such as acetic acid, hydroxyacetic acid, mercaptoacetic acid or salicylic acid; (2) oxalates, or (3) thiosulfates. The scale is removed under alkaline conditions, preferably at pH values of at least 10, usually 10-14, with best results being achieved at about pH 12. When the solvent becomes saturated with scale metal cations, the spent solvent containing dissolved scale is regenerated by acidifying the solvent in the presence of anion which forms a precipitate of an insoluble salt of the alkaline earth metal of the dissolved scale. The precipitate is then removed from the solvent. Thereafter, the pH of the solvent is increased to a pH of about 10 to about 14, to recover a regenerated solvent for reuse, in dissolving scale.

This invention provides an improved method to regenerate the spent solvent by chemically removing the dissolved scale from the spent solvent through precipitation of the dissolved metal ions without decreasing the activity of the regenerated solvent.

SUMMARY OF THE INVENTION

In the method for removing alkaline earth sulfate scale by contacting the scale with an aqueous solvent having a pH of about 10 to about 14, preferably about 12, and comprising a chelating agent comprising a polyaminopolycarboxylic acid or salt of such an acid and an anion synergist comprising an oxalate, thiosulfate, nitriloacetate or monocarboxylic acid; the improvement comprising removing alkaline earth sulfate scale dissolved in said solvent by acidifying the solvent with an acidic chelating agent that releases alkaline earth cations which react with sulfate ions present in the solvent to form a precipitate of an insoluble salt of the alkaline earth metal, separating the precipitate from the solvent and increasing the pH of the solvent to a pH of about 10 to about 14, preferably about 12, by the addition of potassium hydroxide to recover a regenerated solvent for reuse to dissolve scale.

The acidification is carried out using a solid acidic chelating agent such as diethylenetriaminepentaacetic acid (DTPA) or diethylenediaminetetraacetic acid (EDTA), preferably DTPA, until the pH of the solvent has been reduced to either pH 6 or pH 7. At a pH of 6 or 7, the chelating agent originally in the solvent is destabilized by reacting with hydrogen ions and releases alkaline earth cations which react with sulfate anions present in the spent solvent to form a precipitate of an insoluble salt of the alkaline earth metal. Removal of the residual sulfate ions from the solvent is beneficial because these ions are known to inhibit dissolution of alkaline earth sulfate scale by the solvent after the solvent is regenerated.

DESCRIPTION OF THE DRAWING

The drawing illustrates a plot of the amount of barium sulfate recovered from the spent solvent per cycle and the cumulative amount of barium sulfate dissolved per cycle wherein each cycle is the result of reducing the pH of the spent solvent from 12 to 6, precipitation of barium sulfate, and then elevating the pH of the solvent to 12.

DESCRIPTION OF THE PREFERRED EMBODIMENTS

Alkaline earth metal scales, especially barium sulfate scale deposits are removed from oil field and other tubular goods with a scale-removing solvent comprising a chelating agent and a catalyst or synergist to speed up the dissolution of the scale. The pH of the solvent is maintained at pH values of about 10 to about 14, preferably at about 12, with the addition of potassium hydroxide (caustic potash). Suitable chelating agents comprise polyaminopolycarboxylic acid such as EDTA or DTPA or salts of such acids. The catalyst or synergist comprise anions of at least one monocarboxylic acid such as mercaptoacetic acid, aminoacetic acid and hydroxyacetic acid; oxalates, and/or thiosulfates. This invention describes a method for regenerating the solvent containing scale through precipitation of the dissolved metal ions and subsequent upward adjustment of pH to a pH of about 10 to about 14.

The scale solvent effectively removes all the common oil field scales, including sulfates of barium, calcium and strontium, calcium and iron carbonates and naturally occurring radioactive material (NORM), mainly radium 226 and radium 228. The chelating agent in the solvent is capable of binding alkaline earth metal ions tightly at high pH levels. If certain anions that form very insoluble alkaline earth metals are present in the solvent solution after the pH is lowered, then alkaline earth metals may be displaced from the chelating agent originally in the solvent and precipitated. Thus, if the pH of the spent solvent is lowered to either a pH of 6 or 7 with addition of an acidic chelating agent such as diethylenetriaminepentaacetic acid (DTPA) or ethylenediaminetetraacetic acid (EDTA), preferably DTPA, the chelating agent originally in the solvent is destabilized by reacting with hydrogen ions and releases alkaline earth cations which react with residual sulfate ions originally present in the scale dissolved in the solvent to form an insoluble alkaline earth metal sulfate. Removal of the residual sulfate ions from the solvent is beneficial because these ions are known to inhibit dissolution of alkaline earth sulfate scale by the solvent after the solvent is regenerated for reuse. Anions as sulfate in solution at the time of lowering the pH are suitable for forming precipitates with the released metal ions. The following equations illustrate precipitation of barium ions using DTPA:

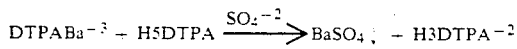

The amount of solid acidic chelating agent used is that amount needed to reduce the pH of the spent solvent to a value of about 6 to 7.

The solvent is then separated from the barium sulfate precipitate by centrifuging, decantation, or filtration. Thereafter, the pH of the solvent is increased to a pH of about 10 to about 14, preferably about 12, by the addition of potassium hydroxide to recover a regenerated solvent for reuse to dissolve scale.

The advantage of the present method of regenerating the spent solvent is the fact that the chelating agent itself is used to lower the solvent pH during the first step of regeneration, which balances the total amount of dilution caused by adding the caustic required to adjust the pH to 12 during the second step of regeneration, thereby maintaining the activity of the chelating agent in the regenerated solvent at least equivalent to or greater than the activity in the spent solvent. Therefore, even though the solvent volume increases with each successive regeneration cycle, the activity of the chelating agent in the regenerated solvent remains at least equivalent to or greater than the activity in the spent solvent.

The following example shows the method of regenerating scale solvents through precipitation of the dissolved metal ions and subsequent upward adjustment of pH.

EXAMPLE

Regeneration of Scale Solvent Using pH Adjustments

A sample of spent scale solvent containing dissolved barium sulfate was treated with solid DTPA (diethylenetriaminepentaacetic acid) until the pH of the solvent was reduced from 12 to 6. At a reduced pH of 6, a precipitate of barium sulfate was formed when the chelating agent (DTPA) was destabilized by reacting with hydrogen ions and releasing barium ions which react with residual sulfate ions to form an insoluble barium sulfate salt. These ions, in addition to strontium, and calcium, are found in oil field scales and could be readily dissolved by the scale solvent. The residual sulfate ions present in the spent solvent are therefore used to advantage to remove the released barium ions as a sulfate precipitate and reduce sulfate concentration in the solvent. Since sulfate ions must be removed in order to further dissolve more alkaline earth sulfate scales, because of the common ion effect, this step has a dual purpose removal of both objectionable cation and anion.

In the second step of the process, the barium sulfate precipitate was removed from the solvent by centrifuging, filtering or decanting the solvent from the precipitate.

In the third step of the process, the pH of the solvent was re-adjusted to 12 with the addition of solid potassium hydroxide (caustic potash) to produce a fully regenerated solvent.

An example of this procedure is shown in the drawing. In the drawing, three cycles of regeneration are illustrated. Cycle zero is the initial amount of barium sulfate dissolved in fresh solvent (61.8 g/l). Cycle #1 is the result of one pH adjustment, precipitation, and re-adjustment of pH. In the drawing, for a pH reduction to 6, a least square line was drawn through the cumulative barium sulfate dissolved in each cycle and was extrapolated through 5 cycles using the right most Y axis. After three cycles, about six times the initial amount of scale is dissolved using this regeneration scheme. It was determined independently of these results that neither the chelating agent (DTPA) nor the synergist (Oxalate) are precipitated during the pH lowering processes. Based on bulk chemical prices (Chemical Marketing, Aug. 20, 1990), the regeneration process is an economical alternative to makeup of fresh scale solvent since the cost of regeneration is only a small fraction of the cost of fresh scale solvent.

What is claimed is:

1. In the method for removing alkaline earth sulfate scale by contacting the scale with an aqueous solvent having a pH of about 10 to about 14 and comprising a chelating agent comprising a polyaminopolycarboxylic acid or salt of such an acid, and a synergist anion selected from the group consisting of anions of at least one monocarboxylic acid, aminoacetic acid and hydroxyacetic acid, oxalates, and thiosulfates; the improvement comprising removing alkaline earth sulfate scale dissolved in said solvent by:

(a) acidifying said solvent with an acidic chelating agent that releases alkaline earth cations which react with sulfate ions present in the solvent to form a precipitate of an insoluble salt of the alkaline earth metal, and (b) separating the precipitate from the solvent and increasing the pH of the solvent to a pH of about 10 to about 14 to recover a regenerated solvent for reuse to dissolve scale.

2. A method according to claim 1 wherein the acidic chelating agent comprises DTPA.

3. A method according to claim 1 wherein the acidic chelating agent comprises EDTA.

4. A method according to claim 1 wherein the scale comprises barium, strontium or calcium sulfate and mixtures thereof and naturally occurring radioactive material (NORM), mainly radium 226 and radium 228.

5. A method according to claim 1 wherein the synergist comprises a monocarboxylic acid.

6. A method according to claim 5 in which the monocarboxylic acid is salicylic acid or a substituted acetic acid.

7. A method according to claim 1 wherein the synergist is oxalate.

8. A method according to claim 1 in which the pH of the solvent containing the dissolved scale in step (a) is reduced to a value of 6 to 7 by the acidification.

9. A method according to claim 1 in which the pH of the solvent in step (b) is increased by the addition of potassium hydroxide.

10. A method according to claim 1 wherein the activity of the chelating agent in the regenerated solvent is at least equivalent to or greater than the activity in the spent solvent.

* * * * *